3,429,179
FASTENER TESTER
Donald R. Bowen, Bloomfield Hills, and Raymond G. Fischer, Birmingham, Mich., assignors to General Motors Corporation, Detroit, Mich., a corporation of Delaware
Filed June 9, 1967, Ser. No. 644,906
U.S. Cl. 73—133                3 Claims
Int. Cl. G01m *15/00;* G01l *3/26*

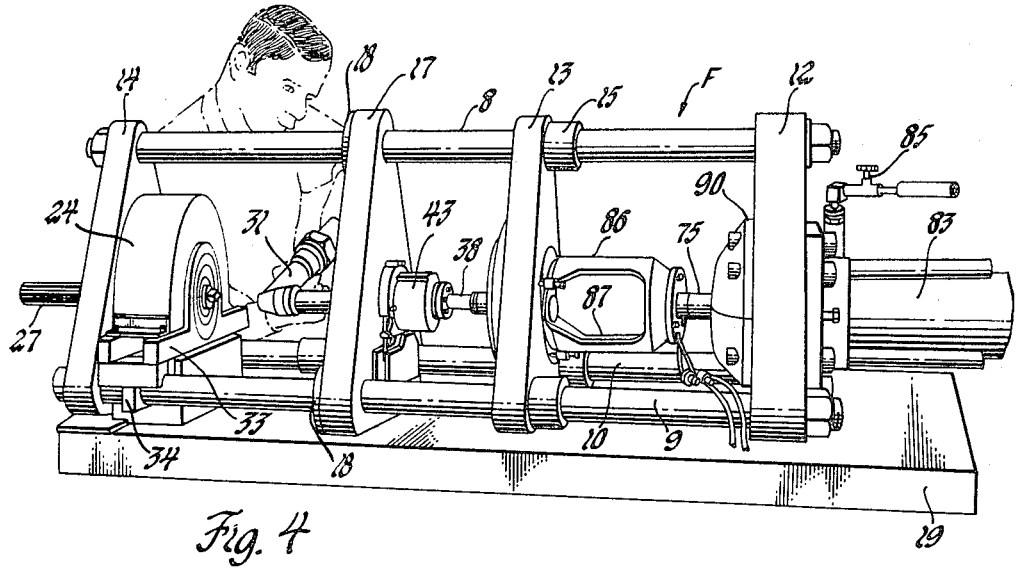
Fig. 4
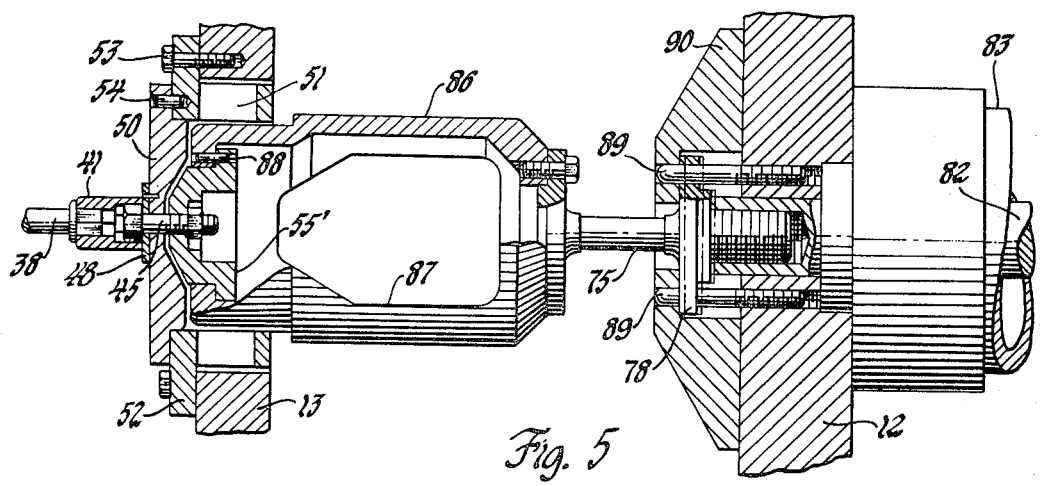
Fig. 5
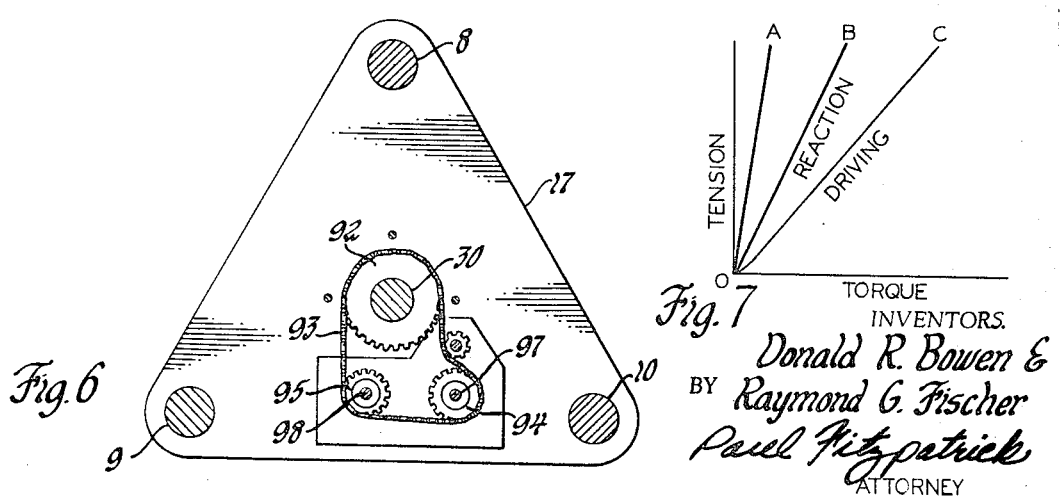
Fig. 6
Fig. 7
INVENTORS.
Donald R. Bowen &
BY Raymond G. Fischer
Paul Fitzpatrick
ATTORNEY United States Patent Office 3,429,179
Patented Feb. 25, 1969

ABSTRACT OF THE DISCLOSURE

A machine for testing threaded fasteners, drivers for them, and assemblies embodying threaded fasteners. Driving and reaction torques, clamping force, fastener tension, angular position of the driver, and driving speed may be measured and indicated or recorded coordinately. Assemblies of varying stiffness may be simulated.

---

Our invention is directed to apparatus for testing threaded fasteners, installations including such fasteners, and tools for driving fasteners.

In its preferred embodiment, our invention is a machine by which the driving torque required to tighten or loosen the fastener and the reaction torque required to hold the nut or the like can be measured, as well as the clamping force exerted by the fastener. Also, an additional pull may be applied to the fastener up to the point of breaking the fastener if desired, and this tension can be measured. Samples of materials against which the fastener is tightened may be included to see the effect upon the characteristics of the fastened joint. Fasteners may be tested against either hard or soft loads. Instrumentation of the device is such that the torques and axial forces may be recorded and also such that the angular displacement and speed of rotation of a driving head may be recorded.

The machine inclues power means for driving a fastener at a fixed speed and also is suited to testing power drivers such as are commonly used on assembly lines, in which case the speed characteristics and torque cut-off point of the driving device may be tested with any specific fastener and assembly to be fastened. The preferred embodiment of the machine involves certain selectively usable devices for different modes of operation and provides a compact, convenient assembly to facilitate rapid and accurate testing of fasteners under conditions approximating those of actual service use.

The principal object of our invention is to provide a device facilitating the testing of fasteners, fastener drivers, and fastened installations. An ultimate object of our invention is to provide greater reliability and economy in structures assembled by threaded fasteners. A further object of our invention is to provide means for accurately evaluating rotary drivers. A still further object is to provide accurate reproducible fastener testing standards which will lead to progress in the art of threaded fasteners.

The nature of our invention and the advantages thereof will be clear to those skilled in the art from the succeeding detailed description of the preferred embodiment of the invention and the accompanying drawings thereof, in which:

FIGURE 4 is a perspective elevation view of the machine illustrating the use of a hand-held power driver.

FIGURE 5 is a vertical sectional view illustrating a setup for measuring reaction torque.

FIGURE 6 is a cross-sectional view illustrating the connection from the fastener drive means to the angular position and speed transmitters.

FIGURE 7 is an explanatory graph.

Figure 1:
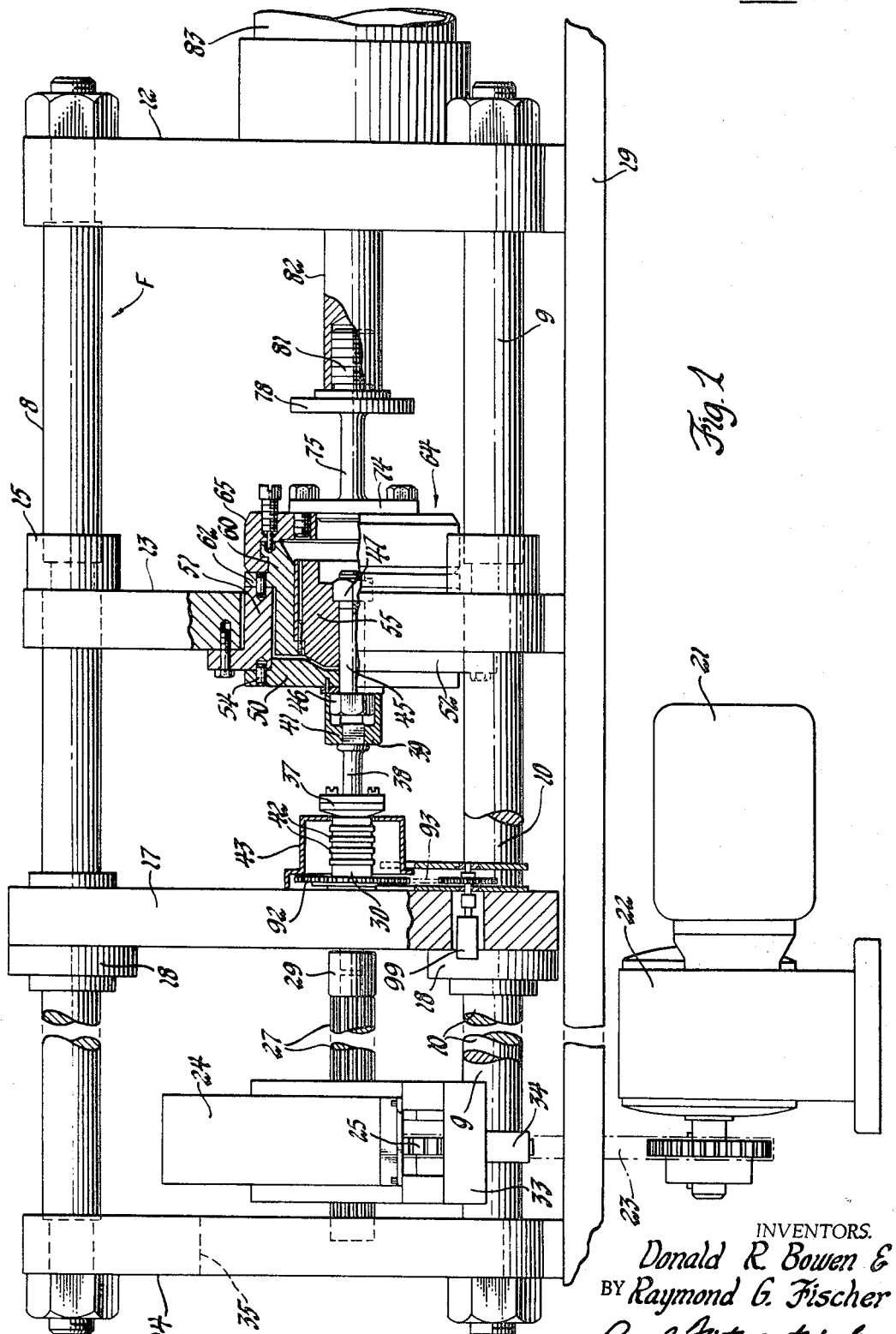
FIGURE 1 is an elevation view, with parts in section, of a testing device.

Referring first to FIGURES 1 and 4, our testing machine includes a rigid frame F made up of three parallel longitudinal members or rails 8, 9 and 10, and three generally triangular cross members or plates 12, 13 and 14. Plates 12 and 14, at the ends of the rails, abut shoulders on the rails and are retained by nuts. Plate 13 abuts collars 15 which in turn abut shoulders on the rails so that a strong rigid connection between plates 13 and 12 to accept compressive loads between them is provided. A fourth triangular plate 17 is mounted so as to move back and forth on the three rails by antifriction ball bushings 18 between the plate and rails so that it will move easily. Plate 17 supports the means to connect the driver to the fastener and also supports the angular position and speed transmitters.

The frame F is mounted on a baseboard 19 which may be the top of a table or cabinet (not illustrated). A motor 21 integral with a reduction gear 22, mounted below the baseboard 19, is coupled by a chain 23 to a driving head 24 including a sprocket 25 coupled to a fastener driving shaft 27 by ball splines (not illustrated) so that the shaft is freely movable axially of the testing device. It may so move as a fastener is driven.

As shown in FIGURE 1, the squared forward end of shaft 27 is connected through a coupler 29 to an intermediate shaft 30 journaled in the movable plate 17. Coupler 29 may have a square internal hole to engage the shafts 27 and 30. As shown in FIGURE 4, shaft 27 may be retracted so as to provide a clear space in front of intermediate shaft 30 so that other drive means may be utilized such as the hand-seld driver 31. The driving head 24 includes a base 33 which rests upon the rails 9 and 10 and may include a retaining bracket 34 to withstand torque tending to lift the driving head. Driving head 24 may be removed in case it is desired to use a driving device beyond plate 14, which has a large hole 35 in its to provide access for drivers if desired.

Intermediate shaft 30 terminates in a flange 37 to which a torsion transducer 38 is bolted. This is a shaft instrumented with strain gauges in known manner so as to transmit an electrical signal of driving torque. Transducer 38 terminates in a square end 39 to couple to any desired device such as the wrench socket 41. The electrical signal is transmitted through slip rings 42 on shaft 30 within a housing 43 fixed to plate 17.

Figure 2:
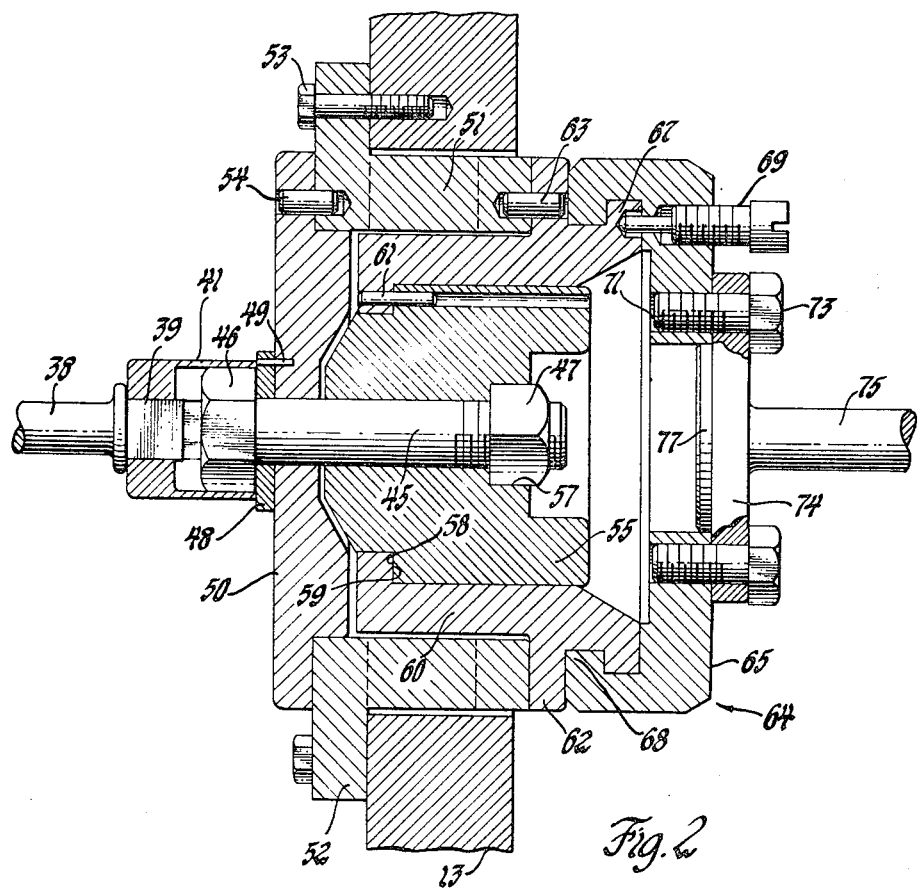
FIGURE 2 is an enlarged partial vertical sectional view, taken through the axis of a fastener, of one setup of the machine.
Figure 3:
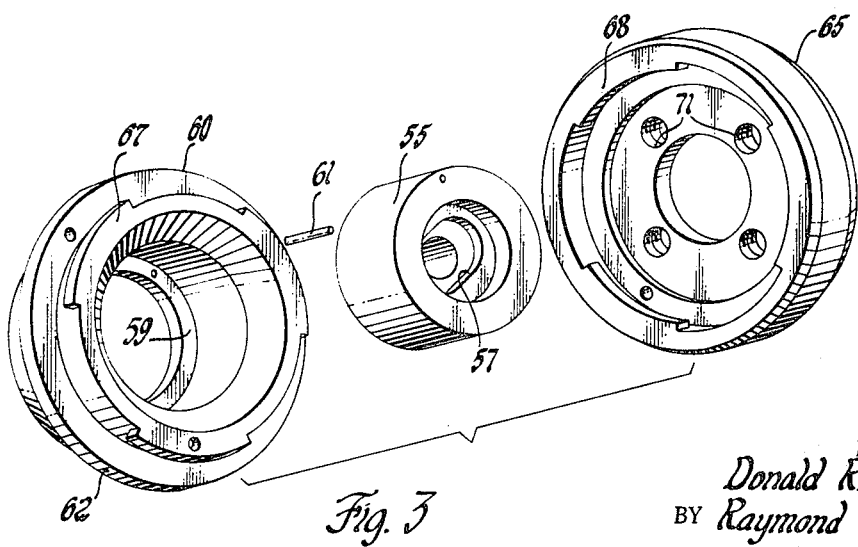
FIGURE 3 is an exploded view of a grip and adapter.

FIGURES 1, 2 and 3 illustrate a setup of the machine for testing the driving torque and clamping force of a fastener. As the setup is illustrated, the exemplary fastener is a bolt 45 having a head 46 and threaded into a hexagon nut 47. The bolt head is engaged by socket 41 which is driven by motor 21 through the head 24, shaft 27, intermediate shaft 30, and driving torque transducer 38. In the preferred embodiment the motor is geared so as to rotate the bolt head at two revolutions per minute. Of course, any desired speed could be used and, if desired, a variable speed motor might be employed. The bolt head 46 bears against a washer 48 which in turn bears against an insert 50 which is an annular plate with a hole for the body of the bolt. Washer 49 is held against rotation by means such as a pin 49. The insert 50 bears against an annular clamping force transducer 51 which has a flange 52 resting against the face of plate 13. Clamping force transducer 51 is a known device which is instrumented with strain gauges to transmit an electrical signal proportional to the axial compressive force exerted on it by the fastener. As shown in FIGURE 2, transducer 51 is fixed to plate 13 by cap screws 53, and in turn holds the adapter 50 against rotation by means of dowels 54 extending from the adapter into the transducer.

The other component of the clamping force is transmitted from the nut 47 through an insert 55 (see also FIGURE 3) which is a generally annular body having elongated slot 57, the flat sides of which nonrotatably engage the nut 47. The bolt 45 passes through a central opening in the insert 55. The insert has a shoulder 58 which abuts a flange 59 of a holder 60. A dowel 61 prevents rotation of the insert in the holder. Holder 61 has an external flange 62 which bears against the opposite end of the clamping force transducer from the insert 50, and is held against rotation by dowels 63. The particular inserts 50 and 55 illustrated are merely exemplary, and the interior hole size and other dimensions of the inserts will be such as to adapt them to the diameter, length, and other characteristics of a particular fastener to be tested. These parts are easily exchanged for adapters of different dimensions. A test piece for a screw may be substituted for an adapter, or mounted on one.

The holder 60 is one part of a grip 64, the other part being a coupler 65. As shown most clearly in FIGURE 3, the holder 60 and coupler 65 have interrupted flanges 67 and 68 which provide a readily separable bayonet joint between the two parts. A detent screw 69 may be fitted to prevent any inadvertent or accidental separation of the parts 60 and 65. The coupler 65 has four threaded holes 71 for cap screws 73 which pass through a flange 74 of a torque and tension transducer 75. The flange 74 includes a pilot 77 which projects into an opening in the grip 65 to align the transducer with the grip. Transducer 75 also includes a flange 78 (FIGURE 1) at the other end. Transducer 75 is provided in known manner with strain gauges so that it transmits electrical values corresponding to the torque and tension on the central body portion 75. The transducer terminates in a threaded stud 81 which is received in the internally threaded end of a piston rod 82. Piston rod 82 projects from a hydraulic cylinder 83 mounted on the outer face of frame member 12 which serves as a pulling device when suitably energized through a valve (not illustrated). A valve 85 (FIGURE 4) may be operated to lock the fluid in the cylinder 83 to maintain the pull on the transducer 75.

FIGURES 4 and 5 illustrate a different setup of the machine from that of FIGURES 1, 2 and 3. However, many of the parts are the same, and where they are the same, the same reference numeral is applied. Here, the pull or clamping force of the fastener and the torque exerted by the nut are transmitted through the torque and tension transducer 75 to the frame cross-member 12. The clamping force transducer 51 is inoperative in this setup. The means for mounting the bolt 45 is the same as previously described, except that in this case a shorter bolt is shown and an insert 55′ of less axial length than the insert 55 is illustrated. The insert 55′ has an external flange which bears against an internal flange of a grip 86 of modified form. This grip is a generally cylindrical body with large access holes 87 in the sides so that the inserts can be fitted and the nuts put on the bolts through the access holes 87. As will be seen, grip 86 is a one-piece device and is thus different from the grip 64. Grip 86 bolts to the torque and tension transmitter 75 in the same way as part 65 of the other grip. A dowel 88 nonrotatably couples adapter 55′ to the grip.

The means for transmitting the torque and tension to the frame member 12 through the transducer 75 is as follows: Four guide pins 89 threaded into the plate 12 extend through openings in flange 78 so as to hold transducer 75 against rotation. An adapter or retaining plate 90 is bolted to the frame plate 12 to provide a cage for flange 78. Adapter 90 is in two parts separated along a diameter of the adapter so that it may be fitted over the flange 78. Adapter 90 has holes which receive the ends of guide pins 89. Thus, with no pressure in cylinder 83, flange 78 bears against adapter 90 to transmit the pull of the fastener 45 to frame plate 12. There is, of course, clearance between the adapters 50 and 55′. In this case the pull of the bolt is transmitted from the bolt head through washer 48, adapter 50, the flange 52 of the clamping force transducer, frame plate 13, and rails 8, 9 and 10 to frame plate 12. Thus, there is a softer connection between the bolt head and nut; that is, the testing apparatus will have a lower spring rate than when the clamping force is transmitted directly from one insert through the clamping force transducer 51 to the other insert, as in the setup of FIGURE 2.

A still softer connection may be had by energizing the cylinder 83 so as to pull the piston rod 82 back very slightly, as indicated by the broken lines in FIGURE 5, so that the flange 78 of the torque and tension transducer no longer bears against the adapter 90. Now, in addition to the circuit referred to above, the load is taken from plate 12 through the walls of the cylinder and back through the piston rod 82 to the transducer 75. This makes a still softer joint. Valve 85 holds the oil.

Referring to FIGURES 1 and 6, the intermediate shaft 30 which drives the fastener is coupled to an angular position transmitter and a velocity transmitter or tachometer generator. A sprocket 92 on shaft 30 is connected by chain 93 to driven sprockets 94 and 95 on shafts 97 and 98. Shaft 97 may drive a position transmitter of any suitable sort (not illustrated) such as a contact maker which closes at every 3 degrees of rotation of shaft 30 to indicate the angle through which the fastener has been driven. Shaft 98 drives a suitable velocity transmitter 99 which may, for example, generate a voltage proportional to the rate of rotation of shaft 30. These values may be coordinated by a conventional recording device which also records the torque transmitted by the transducers 38 and 75 and the axial forces transmitted by the transducers 51 and 75.

The speed reading is useless when the apparatus is being driven by the constant speed motor 21, but it is very desirable in testing other drivers such as are actually used on an assembly line as exemplified by the hand-held driver 31 shown in FIGURE 4. By providing a coordinated record of the speed of movement of the driver as well as the various loads the adequacy of drivers for a particular operation may be accurately checked.

The operation of the testing machine should be clear to those skilled in the art from the foregoing, but it may be desirable to describe it briefly, partly to point out the versatility and practicability of the device. The fastener may be driven by motor 21 through the gearing and shaft 27 or by any suitable hand-held tool such as that shown at 31 in FIGURE 4. In either event, the driving torque is measured by the driving torque transducer 38. In the setup illustrated in FIGURES 1, 2 and 3, the tension of the fastener, or clamping force, is measured by the clamping force transducer 51. Also, in this setup cylinder 83 may be energized to pull on the fastener in which case the tension exerted by the cylinder is measured by the tension transducer portion of transducer 75, as well as the varying clamping force by the transducer 51. It is possible to pull the fastener apart or strip the threads by operation of the cylinder and to measure the force required for this purpose. It is also possible to cycle the force exerted on the fastener and observe the results.

In the alternative setup illustrated in FIGURES 4 and 5, the clamping force transducer 51 is inoperative, but both the axial force and the reaction torque or torque exerted at the non-driven end of the fastener are measured by the tranducer 75. This transducer may be anchored to the frame member 12 through the adapter 90 or a softer joint may be provided by connecting it through the cylinder 83. The angular position and angular velocity transmitters may be used if desired; ordinarily the position transmitter is used and the velocity transmitter is used only when some driver other than motor 21 is employed. All of these transmitters and transducers may be connected to a multiple channel recording device (not illustrated) in known manner so that the various quantities transmitted by the machine are coordinately recorded for subsequent interpretation. Particularly, by use of the speed transmitter, the speed of operation of a hand-held driver together with its consistency of operation on a succession of fasteners may readily be tested.

Interpretation of the results of the test may take the form of a set of curves much as illustrated in FIGURE 7 in which tension is plotted against torques. Line OC represents the driving torque measured by transducer 38 and line OB represents the reaction torque measured by transducer 75. Line OA is the pitch torque, the theoretical torque which would be required to exert the tension in an entirely frictionless system. It is merely a reflection of the mechanical advantage of the screw. In this sort of plot the abscissa between lines OA and OB at any ordinate represents the torque used to overcome thread friction at the particular value of tension. The abscissa between lines OB and BC at any value of tension represents the torque required to overcome bearing face friction under the bolt head to drive to that particular value of tension. Obviously, if desired, the fastener may be tested to destruction or may be tightened and loosened for cycling test either by driving it forwardly and reversely or by tightening it and then cycling the bolt by energization of cylinder 83.

While the discussion so far and the illustrations show a bolt it is clear that any type of threaded or turnable fastener may be tested. For example, the adapter such as 55 may hold any body into which a screw is threaded.

If desired, the driving head 24 may be removed so that the intermediate shaft 30 may be driven by any external device through the opening 35 in frame plate 14.

Washers 48 of various types and materials, or having different platings or surface coatings, may be used to simulate or test any desired installation.

Those skilled in the art will appreciate from the foregoing the utility and versatility of our testing device and the contribution it may make to improved fastener technology. The detailed description of the preferred embodiment of the invention for the purpose of illustrating the principles thereof is not to be considered as restricting or limiting the invention since many modifications may be made by the exercise of skill in the art within the scope of the invention.

We claim:
1. A machine for testing threaded fasteners, drivers for such fasteners, and installations including such fasteners comprising, in combination, a rigid frame including longitudinal and cross members and defining an axis extending through the cross members with which axis the axis of a threaded fastener to be tested is aligned, a first adapter and a second adapter relatively movable along the axis, the first adapter providing an abutment for one end of a fastener, the second adapter providing an abutment and torsional restraint for the other end of the fastener, driving means for driving the said one end of the fastener including a driving torque responsive means, clamping force responsive means disposable between the adapters to sense clamping force exerted by the fastener, a pulling device mounted on the frame adapted to exert a force along the axis away from the driving means, connecting means adapted to connect the pulling device rigidly to the second adapter, the connecting means including a reaction torque responsive means and an axial force responsive means, means for coupling the connecting means to the frame to hold the connecting means against rotation about the axis, means attachable to the connecting means and frame effective to couple the connecting means directly to the frame independently of the pulling device and to withstand the tension of the fastener independently of the clamping force measuring means, means for energizing the pulling device so as to transmit the tension of the fastener to the frame through the pulling device, and means for sensing movement of the dirving means.

2. A machine as recited in claim 1 providing access for a hand-held fastener driver to the said driving means.

3. A machine as recited in claim 1 in which the last-recited means senses angular displacement and angular velocity.

References Cited

UNITED STATES PATENTS

| 2,441,608 | 5/1948 | Warner | 73—133 |
| 2,957,342 | 10/1960 | Hanneman | 73—133 |
| 3,096,643 | 7/1963 | Essenmacher | 73—133 |

RICHARD C. QUEISSER, *Primary Examiner.*

C. M. OVERBEY, *Assistant Examiner.*

U.S. Cl. X.R.

73—141